US012174657B2

(12) United States Patent
Gao et al.

(10) Patent No.: US 12,174,657 B2
(45) Date of Patent: Dec. 24, 2024

(54) CLOCK DISTRIBUTION METHOD AND APPARATUS IN NETWORK

(71) Applicant: Telefonaktiebolaget LM Ericsson (publ), Stockholm (SE)

(72) Inventors: Guoliang Gao, Beijing (CN); Yao Peng, Beijing (CN); Jun Wang, Beijing (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 244 days.

(21) Appl. No.: 17/620,960

(22) PCT Filed: Jun. 21, 2019

(86) PCT No.: PCT/CN2019/092421
§ 371 (c)(1),
(2) Date: Dec. 20, 2021

(87) PCT Pub. No.: WO2020/252797
PCT Pub. Date: Dec. 24, 2020

(65) Prior Publication Data
US 2022/0326728 A1    Oct. 13, 2022

(51) Int. Cl.
*G06F 1/08* (2006.01)
*G06F 1/10* (2006.01)
*H04J 3/06* (2006.01)

(52) U.S. Cl.
CPC . *G06F 1/08* (2013.01); *G06F 1/10* (2013.01)

(58) Field of Classification Search
CPC ............. G06F 1/08; G06F 1/10; H04J 3/0641
See application file for complete search history.

(56) References Cited

U.S. PATENT DOCUMENTS 6,970,047 B1    11/2005  Johnson et al.
8,503,597 B2    8/2013   Fischette et al.
(Continued)

FOREIGN PATENT DOCUMENTS

CN    102036361 A    4/2011
CN    103248445 A    8/2013
(Continued)

OTHER PUBLICATIONS

International Search Report and Written Opinion dated Mar. 12, 2020 in International Application No. PCT/CN2019/092421 (7 pages total).

(Continued)

*Primary Examiner* — Jaweed A Abbaszadeh
*Assistant Examiner* — Gayathri Sampath
(74) *Attorney, Agent, or Firm* — Rothwell, Figg, Ernst & Manbeck, P.C.

(57) ABSTRACT

The present disclosure relates to a clock distribution method and apparatus in a network. The method performed at a first clock distribution apparatus comprises: determining (S101) whether the first clock distribution apparatus is in a lock state; and transmitting (S102), to a second clock distribution apparatus, a first announce message when the clock distribution apparatus is not in the lock state; wherein the first announce message is generated based on a default configuration about a local clock state of the first clock distribution apparatus. According to embodiments of the present disclosure, the clock distribution apparatus may generate first announce messages based on a local clock state of the clock distribution apparatus. Thus, a downstream apparatus which receives the first announce message may avoid selecting an unstable/unlocked clock distribution apparatus as the best master, based on the local clock state of the clock distribution apparatus.

11 Claims, 7 Drawing Sheets

(56) References Cited

U.S. PATENT DOCUMENTS

| | | | | |
|---|---|---|---|---|
| 2014/0036903 A1* | 2/2014 | Ryan | ............... | H04W 56/00 |
| | | | | 370/350 |
| 2014/0185632 A1* | 7/2014 | Steiner | ............ | H04J 3/0658 |
| | | | | 370/503 |
| 2015/0188691 A1* | 7/2015 | Mizuguchi | ......... | H04L 7/0012 |
| | | | | 375/355 |
| 2016/0277138 A1* | 9/2016 | Garg | ............... | H04J 3/0641 |
| 2016/0294545 A1* | 10/2016 | Wong | .............. | H04J 3/0685 |
| 2018/0062780 A1* | 3/2018 | Shimizu | ........... | H04N 21/242 |

FOREIGN PATENT DOCUMENTS

| | | |
|---|---|---|
| EP | 1 872 533 A1 | 1/2008 |
| EP | 2 820 783 A2 | 1/2015 |

OTHER PUBLICATIONS

ITU-T G.8275.2/Y.1369.2, "Precision time protocol telecom profile for phase/time synchronization with partial timing support from the network", Mar. 2020, International Telecommunication Union (70 pages total).

IEEE 1588 Standard V2, IEEE Standard for a Precision Clock Synchronization Protocol for Networked Measurement and Control Systems, Jul. 24, 2008, IEEE Instrumentation and Measurement Society (289 pages total).

* cited by examiner

CLOCK DISTRIBUTION METHOD AND APPARATUS IN NETWORK

CROSS REFERENCE TO RELATED APPLICATION

This application is a 35 U.S.C. § 371 National Stage of International Patent Application No. PCT/CN2019/092421, filed Jun. 21, 2019.

TECHNICAL FIELD

The present disclosure relates generally to the technology of communication network, and in particular, to a clock distribution method and apparatus in a network.

BACKGROUND

In a communication network, the clock synchronization between different apparatus is very important for a collaboration and communication with each other. Clock distribution apparatus cascaded in the network distribute the clock signal received from clock source to each apparatus in the network, such as a terminal device.

A downstream apparatus may receive clock signals from more than one clock distribution apparatus, and selects one clock distribution apparatus as the best one, based on best master clock algorithm, BMCA, by considering factors such as clockQuality, Priority, etc.

For example, the downstream apparatus may receive messages (e.g. announce messages) in the same format from the more than one clock distribution apparatus. Then the downstream apparatus compares different values of a plurality of parameters included in the receive messages, so as to determine which clock distribution apparatus is the best one.

SUMMARY

Certain aspects of the present disclosure and their embodiments may provide solutions to these or other challenges. There are, proposed herein, various embodiments which address one or more of the issues disclosed herein.

A first aspect of the present disclosure provides a method performed at a first clock distribution apparatus. The method comprises: determining whether the first clock distribution apparatus is in a lock state; and transmitting, to a second clock distribution apparatus, a first announce message when the first clock distribution apparatus is not in the lock state. The first announce message is generated based on a default configuration about a local clock state of the first clock distribution apparatus.

In embodiments of the present disclosure, the lock state indicates a synchronization with an upstream apparatus.

In embodiments of the present disclosure, the upstream apparatus comprises: a grandmaster, GM, clock apparatus, or a boundary clock apparatus.

In embodiments of the present disclosure, the lock state comprises: a phase lock state.

In embodiments of the present disclosure, the method further comprises: transmitting, to the second clock distribution apparatus, a second announce message when the first clock distribution apparatus is in the lock state. The second announce message is generated based on information received from the upstream apparatus.

In embodiments of the present disclosure, the default configuration comprises: a default value for a clock quality of the clock distribution apparatus.

In embodiments of the present disclosure, the default value is for a clock class of the first clock distribution apparatus.

In embodiments of the present disclosure, the default value is included in a field of grandmasterClockQuality.clockClass in the first announce message.

In embodiments of the present disclosure, the default value for the clock quality indicates a clock quality equal to or worse than an actual clock quality of the first clock distribution apparatus.

In embodiments of the present disclosure, the first clock distribution apparatus is restored from a disconnection situation.

In embodiments of the present disclosure, the first clock distribution apparatus is a telecom boundary clock, T-BC, apparatus; and the first announce message is a precision time protocol, PTP, message.

In embodiments of the present disclosure, the method further comprises: receiving a third announce message from an upstream apparatus.

In embodiments of the present disclosure, the default configuration comprises a default value for a clock quality larger than a clock quality value in the third announce message.

A second aspect of the present disclosure provides a method performed at a second clock distribution apparatus. The method comprises: receiving, from a first clock distribution apparatus, a first announce message, when the first clock distribution apparatus is not in the lock state. The first announce message is generated by the first clock distribution apparatus based on a default configuration about a local clock state of the first clock distribution apparatus.

A third aspect of the present disclosure provides a first clock distribution apparatus, comprising: a processor; and a memory, containing instructions executable by the processor. The first clock distribution apparatus is operative to: determine whether the first clock distribution apparatus is in a lock state; and transmit, to a second clock distribution apparatus, a first announce message when the first clock distribution apparatus is not in the lock state. The first announce message is generated based on a default configuration about a local clock state of the first clock distribution apparatus.

In embodiments of the present disclosure, the first clock distribution apparatus is operative to implement the method according to any of embodiments of the first aspect of the present disclosure.

A fourth aspect of the present disclosure provides a second clock distribution apparatus, comprising: a processor; and a memory, containing instructions executable by the processor. The second clock distribution apparatus is operative to: receive, from a first clock distribution apparatus, a first announce message when the first clock distribution apparatus is not in a lock state. The first announce message is generated by the first clock distribution apparatus based on a default configuration about a local clock state of the first clock distribution apparatus.

A fifth aspect of the present disclosure provides a computer readable storage medium having a computer program stored thereon. The computer program is executable by apparatus to cause the apparatus to carry out the method according to any of embodiments of the first aspect and the second aspect of the present disclosure.

A sixth aspect of the present disclosure provides a first clock distribution apparatus, comprising: a determination unit, configured to determine whether the clock distribution apparatus is in a lock state; and a transmission unit, configured to transmit, to a second clock distribution apparatus, a first announce message when the clock distribution apparatus is not in the lock state. The first announce message is generated based on a default configuration about a local clock state of the clock distribution apparatus.

A seventh aspect of the present disclosure provides a second clock distribution apparatus, comprising: a receiving unit, configured to receive, from a first clock distribution apparatus, a first announce message when the first clock distribution apparatus is not in a lock state. The first announce message is generated by the first clock distribution apparatus based on a default configuration about a local clock state of the first clock distribution apparatus.

According to embodiments of the present disclosure, the clock distribution apparatus may generate announce messages based on a local clock state of the clock distribution apparatus. Thus, a downstream apparatus which receives the announce messages may avoid selecting an unstable/unlocked clock distribution as the best master, based on the local clock state of the clock distribution apparatus.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
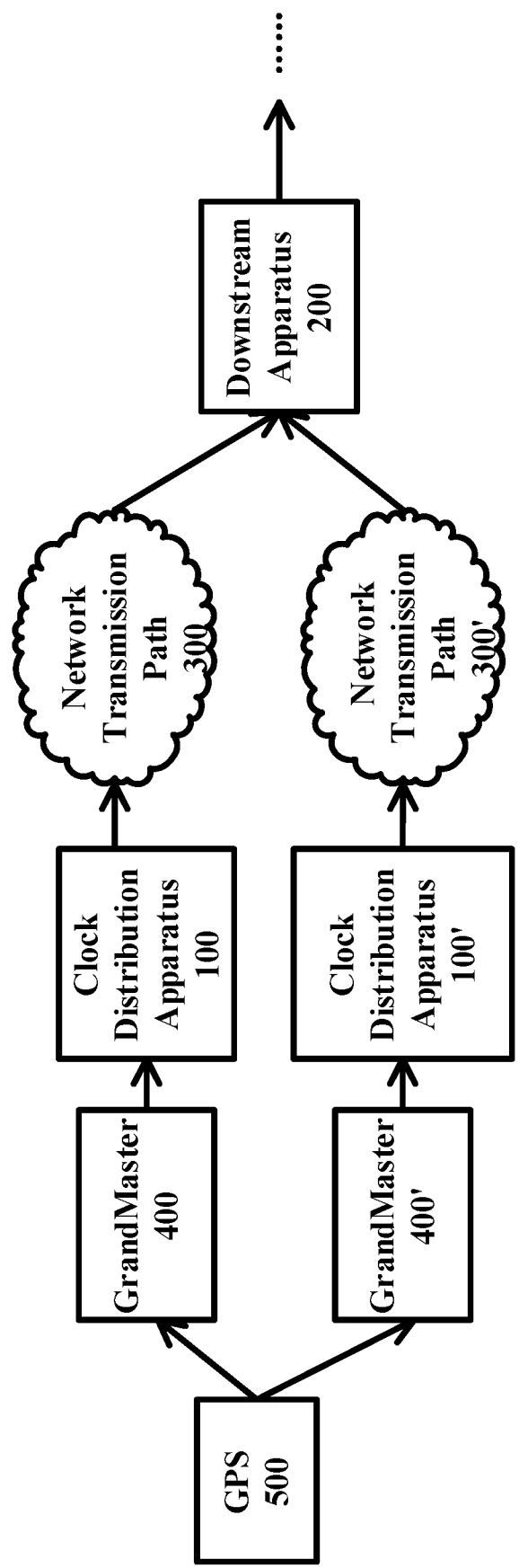
FIG. 1 is an exemplary block diagram showing clock distribution apparatuses in a communication system.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network", or "communication network/system" refers to a network/system following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "apparatus" herein may refer to any end device that can access a communication network and provides/receive services therefrom. By way of example and not limitation, the apparatus comprises a terminal device, and further the terminal device may refer to a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

More specific example is assumed below for a more illustrative description, but it is not limitation to the present disclosure.

Generally, the clock distribution apparatus only includes clock information (e.g. clock quality) from a further upstream apparatus (e.g. a grandmaster, GM, clock apparatus, or a boundary clock apparatus) in the announce message, ignoring the operation state of the clock distribution apparatus itself.

When the clock distribution apparatus is not in a stable state, the downstream apparatus might make wrong determination only based on information about the further upstream apparatus of the clock distribution apparatus. For example, the downstream apparatus may still determine that the clock distribution apparatus is the best one, due to information about the upstream apparatus of the clock distribution, but will only receive, from the clock distribution apparatus, unstable clock signal not in accordance with the parameters conveyed in the announce message, such as clockQuality.

For example, a parameter, such as clockQuality, in the announce message of the distribution apparatus may indicate a high clock quality of the upstream apparatus of the clock distribution, based on which the downstream apparatus should select and use the clock signal from the distribution apparatus. However, in fact, the clock signal from the distribution apparatus is not stable, and the downstream apparatus will not operate normally if it is sensitive to the clock signal.

FIG. 1 is an exemplary block diagram showing clock distribution apparatuses in a communication system.

As shown in FIG. 1, the clock distribution apparatuses, such as clock distribution apparatus 100 and clock distribution apparatus 100' (as the first clock distribution apparatus (100, 100')), may be telecom boundary clock, T-BC, apparatuses. Any T-BC may operate according to the precious time protocol, PTP, defined by a standard of Institute of Electrical and Electronics Engineers, IEEE 1588-2008 (V2, approved 27 Mar. 2008) (see page 76 etc.).

The PTP is a protocol that may synchronize clocks throughout a communication network (e.g. a packet network). The protocol uses a hierarchical master-slave relationship for clock distribution. PTP is used to synchronize precisely time across a packet network to transfer the passage of time from one PTP clock to the other.

The profile ITU-T G.8275.2/Y.1369.2 (June 2016) defines a specific architecture to allow the distribution of phase/time with precision time support (PTS) from the network, wherein ITU-T refers to International Telecommunication Union-Telecommunication Standardization Sector. The profile bases on the PTP defined in IEEE 1588-2008 (V2, approved 27 Mar. 2008), and may work in the unicast mode.

According to ITU-T G.8275.2/Y.1369.2 (June 2016) profile, a (Partial-Support) Telecom Boundary Clock, T-BC, is a boundary clock with multiple PTP ports connecting to multiple upstream apparatuses, such as a grandmaster, GM, or a boundary clock apparatus. These PTP ports receive the announce messages from these GM clock, and one of these GM clock may be chose as the best GM clock according to the Alternate BMCA algorithm "6.7 Alternate BMCA, telecom slave model and master selection process" which is defined in "Rec. ITU-T G.8275.2/Y.1369.2 (June 2016)", wherein BMCA refers to best master clock algorithm. And the T-BC will calibrate the phase/time accord to the GM, and then distribute the local phase/time to its downstream.

Specifically, in FIG. 1, one grandmaster 400 and another grandmaster 400' generate GM clocks based on GPS signals from the global positioning system, GPS 500. The clock distribution apparatus 100 generates announce messages based on GM clock received from the grandmaster 400, and clock distribution apparatus 100' generates announce messages based on GM clock received from the grandmaster 400'. A downstream apparatus (e.g. a second clock distribution apparatus, such as a T-BC) 200 receives these announce messages respectively via one network transmission path 300 and via another transmission path 300'.

The second clock distribution apparatus 200 in the downstream may be also a PTP slave clock.

Figure 2:
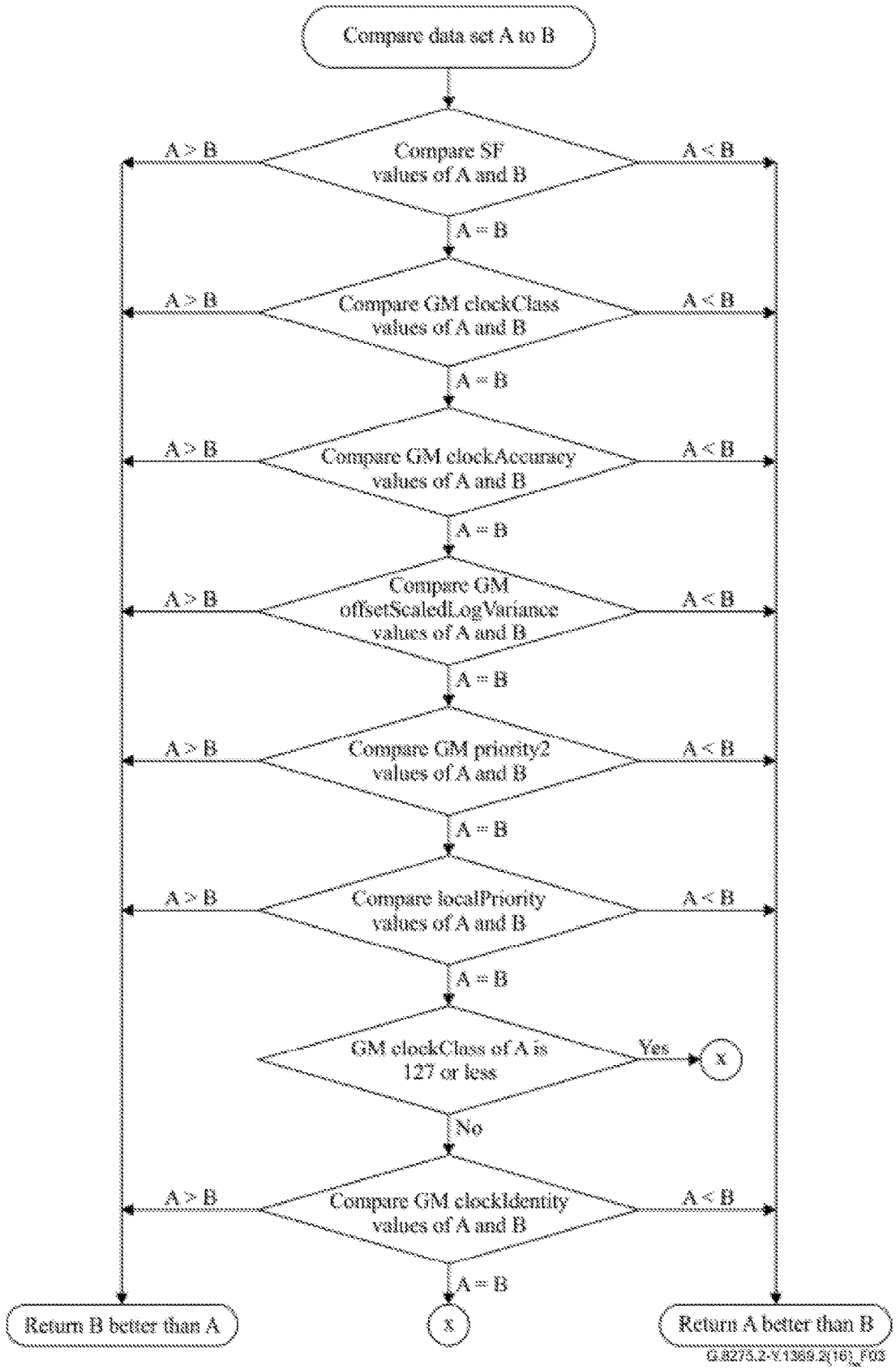
FIG. 2 is a flow chart showing a data set comparison algorithm, part 1, for Alternate BMCA, as defined in the FIG. 3 in the ITU-T G.8275.2/Y.1369.2 (June 2016)
Figure 3:
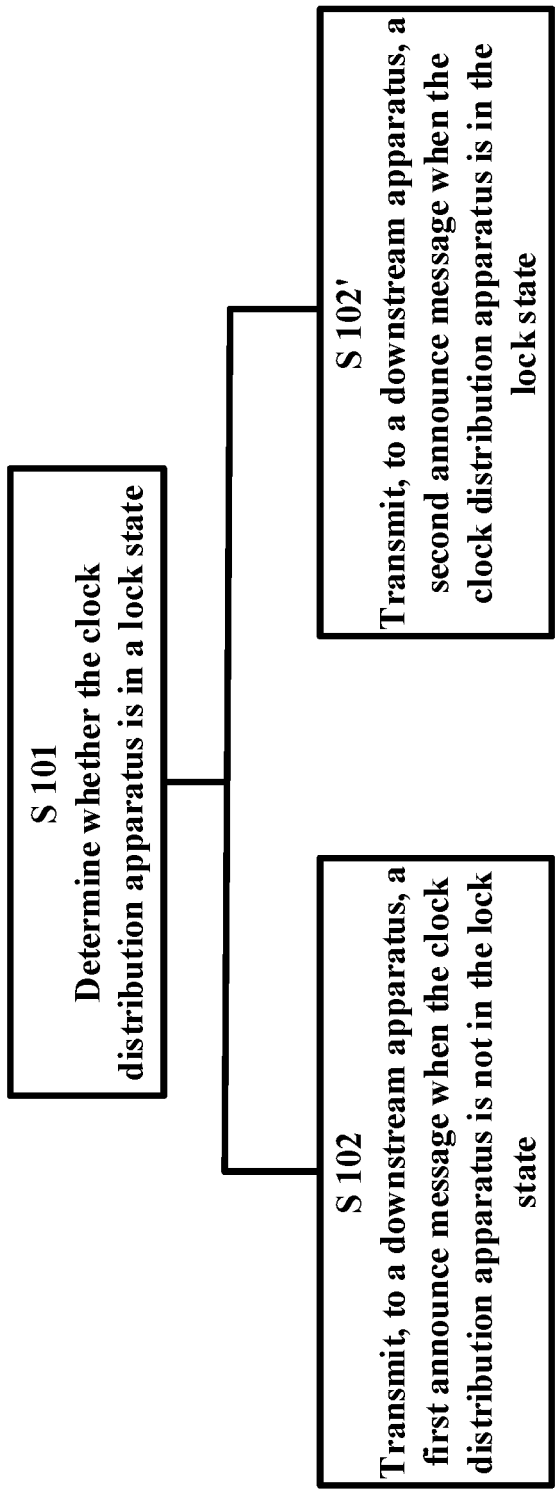
FIG. 3 is an exemplary flow chart showing a method performed at the clock distribution apparatus according to embodiments of the present disclosure.

FIG. 2 is a flow chart showing a data set comparison algorithm, part 1, for Alternate BMCA, as defined in the FIG. 3 in the ITU-T G.8275.2 Y.1369.2 (June 2016).

In a timing network environment as shown in FIG. 1, multi clock sources, such as the grandmaster 400 and the grandmaster 400' can provide high accuracy Frequency or Phase to one T-BC. The T-BC will choose a clock source which is the best one, this is decided by the Alternate BMCA algorithm. The Alternate BMCA algorithm is based on the announce messages received by the T-BC clock, while the announce messages include the GM clock information.

When the T-BC has been synchronized to the time source, the T-BC can stably transmit announce messages to the downstream. The downstream clock will further choose this T-BC as best clock source.

Further, when the T-BC has not been synchronized to the time source (i.e. unstable/unlocked), it may still receive a GM clock announce message which will be further introduced to downstream. So, the downstream clock will still choose this T-BC as best clock source. However, the T-BC can only provide unstable Frequency and Phase when not synchronized. If the downstream is very sensitive to input Frequency and Phase, the downstream apparatus will not operate normally due to an unstable downstream clock.

For example, it is assumed that the grandmaster 400 has priority2=10 with clockClass 6 (e.g. locking to GPS 500) and the clock distribution apparatus 100 choose the grandmaster 400 as its primary clock and distribute phase/time to the downstream apparatus 200. In FIG. 1, other apparatuses (e.g. other grandmasters) providing clock signals to the first clock distribution apparatus are not shown.

It is assumed that the grandmaster 400' has priority2=20 with clockClass 6 (e.g. locking to GPS 500 and clock distribution apparatus 100' chooses the grandmaster 400' as its primary clock and distribute phase/time to the downstream apparatus 200.

The downstream apparatus 200 will compare data set "A", e.g. from the clock distribution apparatus 100, and data set "B", e.g. from the clock distribution apparatus 100'. SF values, GM clockClass values, GM clock Accuracy values, GM offsetScaledLogVariance values might be just the same. Then, since "10" means a higher priority than "20", the downstream apparatus 200 will choose the grandmaster 400 as its primary clock accord to the received announce message and the result of Alternate BMCA algorithm, and the grandmaster 400' will be its backup clock.

When the clock distribution apparatus 100 is disconnected, i.e., restarted or removed, the downstream apparatus 200 will choose backup clock, i.e., clock distribution apparatus 100' as its primary clock.

When the clock distribution apparatus 100 restores and builds up connection with the downstream apparatus 200, the clock distribution apparatus 100 transmits the announce messages by carrying parent GM's information (e.g. clockClass). At the beginning of the restoration, the local clock of clock distribution apparatus 100 has not synchronized to the grandmaster 400, and the stability of the local clock is worse than clock distribution apparatus 100'. But the downstream apparatus 200 still switches to the clock distribution apparatus 100 because the clock distribution apparatus 100 has higher quality than clock distribution apparatus 100', due to the comparison procedure shown in FIG. 2.

The downstream apparatus 200 choosing the unstable clock source (the clock distribution apparatus 100) will further distribute an unstable Frequency and Phase to its downstream. All the downstream nodes which use the unstable Frequency and Phase may be affected, and some sensitive nodes might not operate normally.

As one improvement, the T-BC may send out the Announce Messages which include the Grandmaster information in some fields whether the Local Clock is LOCKED or not, and this information should distribute to downstream PTP Clocks.

FIG. 3 is an exemplary flow chart showing a method performed at the clock distribution apparatus according to embodiments of the present disclosure.

As shown in FIG. 3, the method comprises: step S101, determining whether the clock distribution apparatus is in a lock state; and step S102, transmitting, to a downstream apparatus (i.e. a second clock distribution apparatus), a first announce message when the clock distribution apparatus (i.e. the first clock distribution apparatus) is not in the lock state, or step S102', transmitting a second announce message when the clock distribution apparatus (i.e. the first clock distribution apparatus) is in the lock state. The first announce message is generated based on a default configuration about a local clock state of the clock distribution apparatus.

Further, embodiments of the present disclosure provide a method performed at an apparatus, such as the downstream apparatus 200, which is at downstream relative to the clock distribution apparatus. The method performed at the apparatus comprises: receiving, from a clock distribution apparatus, an announce message. The announce message comprises a first announce message when the clock distribution apparatus is not in a lock state, or a second announce message when the clock distribution apparatus is in the lock state. The first announce message is generated by the clock distribution apparatus based on a default configuration about a local clock state of the clock distribution apparatus.

The downstream apparatus 200 will use parameters from the first announce message to do the comparison procedure as shown in FIG. 2, so as to select the best master.

According to embodiments of the present disclosure, the clock distribution apparatus generates different announce messages, based on its state. Due to such different announce messages, the downstream apparatus may be able to aware of the unstable clock distribution apparatus, e.g., such clock distribution apparatus at the beginning of the restoration, so as to avoid selecting an unstable/unlocked clock distribution apparatus as the best master.

Further, the first announce message is generated based on a default configuration about a local clock state of the clock distribution apparatus. Namely, the first announce message may be able to present the true situation of the clock received by the downstream apparatus.

In embodiments of the present disclosure, the clock distribution apparatus is a telecom boundary clock, T-BC, apparatus; and any of the first announce message and the second announce message is a precision time protocol, PTP, message.

In embodiments of the present disclosure, the upstream apparatus comprises: a grandmaster, GM, clock apparatus, or a boundary clock apparatus.

In embodiments of the present disclosure, the second announce message is generated based on information received from the upstream apparatus. For example, the clock distribution apparatus may obtains values of "grandmasterPriority1", "grandmasterClockQuality", "grandmasterPriority2", "grandmasterIdentity", etc. as shown in the table 1 (as the same as the table 25, in section 13.5.1 of IEEE1588-2008 (V2, approved 27 Mar. 2008)) and includes them in the announce messages.

TABLE 1

Announce Message Fields

| Bits | | | | | | | | Octets | Offset |
|---|---|---|---|---|---|---|---|---|---|
| 7 | 6 | 5 | 4 | 3 | 2 | 1 | 0 | | |
| header (see 13.3) | | | | | | | | 34 | 0 |
| originTimestamp | | | | | | | | 10 | 34 |
| currentUtcOffset | | | | | | | | 2 | 44 |
| reserved | | | | | | | | 1 | 46 |
| grandmasterPriority1 | | | | | | | | 1 | 47 |
| grandmasterClockQuality | | | | | | | | 4 | 48 |
| grandmasterPriority2 | | | | | | | | 1 | 52 |
| grandmasterIdentity | | | | | | | | 8 | 53 |
| stepsRemoved | | | | | | | | 2 | 61 |
| timeSource | | | | | | | | 1 | 63 |

However, according to embodiments of the present disclosure, for the first announce message, if the T-BC Local Clock is not LOCKED, the T-BC may use the Default Data Set to replace the GM information to rebuild the Announce Messages, thereby causing that the T-BC has lower possibility to be selected than another T-BC. Then, after the T-BC Local Clock achieve LOCKED state, the Announce Messages will not be replaced by Default Data Set. Thus, the T-BC can be chosen as the best clock again.

In embodiments of the present disclosure, the default configuration comprises: a default value for a clock quality of the clock distribution apparatus.

The default configuration may be a predetermined data set configured/stored in the clock distribution. This predetermined data set may comprise at least one default value, which is also predetermined.

In embodiments of the present disclosure, the default value is for a clock class of the clock distribution apparatus. This is, a clock class value is used to at least partially indicate a clock quality of the clock distribution apparatus.

As shown in FIG. 2, the at least one default value may correspond to at least one of the parameters which is compared. Particularly, since the clock class value is compared before many of these parameters, it will be advantage to use the clock class to shorten the comparison procedure.

In embodiments of the present disclosure, the default value is included in a field of grandmasterClockQuality.clockClass in the first announce message.

In embodiments of the present disclosure, the default value for the clock quality indicates a clock quality equal to or worse than an actual clock quality of the first clock distribution apparatus.

Particularly, the grandmasterClockQuality field of announce message may be used to influence downstream node's clock selection, and detailed information is specified as below.

Based on the example illustrated in the FIG. 1, when all the apparatuses are connected and stable. The grandmaster 400 has priority2=10 with clockClass 6 and the clock distribution apparatus 100 chooses the grandmaster 400 as its primary clock and distribute phase/time to the downstream apparatus 200. The grandmaster 400' has priority2=20 with clockClass 6 and clock distribution apparatus 100' chooses the grandmaster 400' as its primary clock and distribute phase/time to the downstream apparatus 200. The downstream apparatus 200 will choose the grandmaster 400 as its primary clock according to the received announce message and the result of Alternate BMCA algorithm, and the grandmaster 400' will be its backup clock.

The clock distribution apparatus 100 is in a lock state, and it may distribute the second announce message with the received Grandmaster's information has fields as below:

grandmasterClockQuality.clockClass=6 (A clock that is synchronized to a primary reference time source);

grandmasterClockQuality.clockAccuracy=0x21 (The time is accurate to within 100 ns).

When the clock distribution apparatus 100 is disconnected (restarted or removed), the downstream apparatus 200 will choose backup clock, the grandmaster 400', as its primary clock.

In embodiments of the present disclosure, the clock distribution apparatus is restored from a disconnection situation.

At the beginning of restoration of the clock distribution apparatus 100, it builds up the connection with the downstream apparatus 200, but the local clock of clock distribution apparatus 100 is not locked to the grandmaster 400. According to embodiments of the present disclosure, the clock distribution apparatus 100 may send out the first Announce Messages including the Default Data Set of clock distribution apparatus 100, which means that the information carried in announce message will be: defaultDS.clockQuality.clockClass=248, and defaultDS.clockQuality.clockAccuracy=0xFE.

Namely, when the clock distribution apparatus 100 is not in a lock state, e.g. at the beginning of being restored/reconnected to the link to the downstream apparatus 200, it will distribute a first announce message by replacing the corresponding fields of the above second announce message as below:

defaultDS.clockQuality.clockClass=248 (local free-run clock's quality level, the actual clock class of the local clock distribution apparatus 100), or a value more the 248 (indicating a worse quality);

defaultDS.clockQuality.clockAccuracy=0xFE.

Then, according to the BMCA captured shown in FIG. 2, the downstream apparatus 200 will still choose the grandmaster 400' as its primary clock since the clock distribution apparatus 100' announce a better clock quality, "clockClass 6".

Namely, a default/predetermined value "248" will overwrite the value "6" of the grandmaster. According to procedure as shown in FIG. 2, when the "GM clockClass" values are compared, the big value "248" will easily cause a lower selection possibility of the clock distribution apparatus transmitting the first announce message than another clock distribution apparatus.

It should be understood that any value more the "2" may be used, so as to reduce the selection possibility of the clock distribution apparatus.

In embodiments of the present disclosure, the method may further comprise: receiving a third announce message from an upstream apparatus. Namely, the clock distribution apparatus 100 obtains the "grandmasterClockQuality.clockClass" (i.e., "6") included in a received announce message from an upstream apparatus.

In embodiments of the present disclosure, the default configuration comprises a default value for a clock quality larger than a clock quality value in the third announce message. Namely, then, the clock distribution apparatus 100 may choose any value larger than "6", arbitrarily.

However, a value which is the actual class, such as "248", of the clock distribution apparatus will give the downstream apparatus extra information about the clock distribution apparatus. Thus, even when the downstream apparatus only receives announce messages from (one or more) unstable clock distribution apparatus, the downstream apparatus may still have choice based on the actual class of the unstable clock distribution apparatus. Alternatively, a more value of the actual class, such as more than "248", will further reduce the selection possibility.

Then, the clock distribution apparatus 100 is locked to the grandmaster 400 again. Thus, its Frequency and Phase are stably traced to the grandmaster 400. The clock distribution apparatus 100 may use the Grandmaster information to build the second Announce Messages again. And at that time, as already described above, the downstream apparatus 200 should choose the clock distribution apparatus 100 as its primary clock again.

Figure 4:
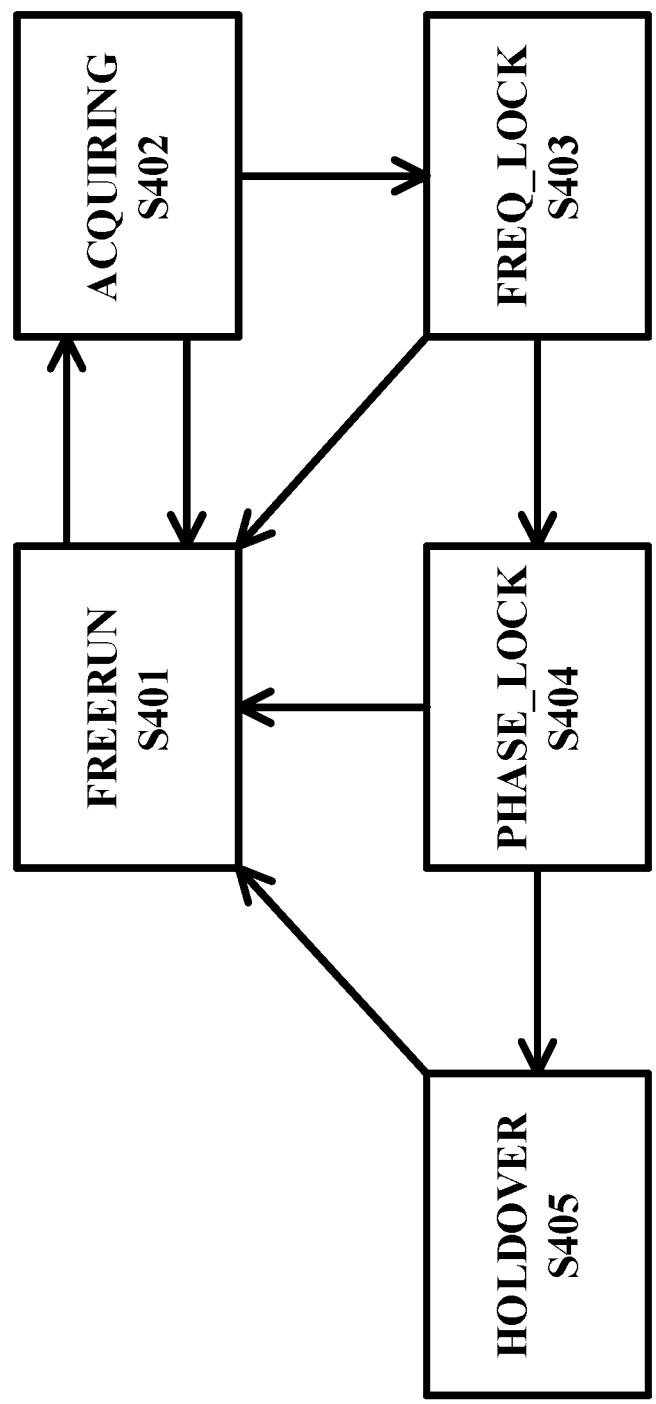
FIG. 4 is an exemplary block diagram showing a state machine of a clock distribution apparatus, according to embodiments of the present disclosure.

FIG. 4 is an exemplary block diagram showing a state machine of a clock distribution apparatus, according to embodiments of the present disclosure.

As shown in FIG. 4, the local clock state can transit due to the state machine after the clock distribution apparatus reboots/restarts. The state machine includes following states.

State 401, FreeRun: After the restart, if there is no historical data available, the clock distribution apparatus will enter into this FreeRun state.

State 402, Acquiring: When the clock starts to exchange timestamp with its remote GM (Grandmaster), and calibrate the local clock, it will be in acquiring state.

State 403, Frequency Lock: after some time calibration, when the lock clock's frequency accuracy meet the set criteria (e.g. 16 parts per billion, ppb), it will enter into Frequency lock state, however, the time/phase might still not accuracy enough at this state.

In embodiments of the present disclosure, when the clock distribution apparatus (clock state) is in the FreeRun, Acquiring and Frequency lock, it will use the rebuild announce message function to rebuild the grandmasterClockQuality field of the first announce message as specified above.

State 404, Phase lock: When the clock reach both frequency synchronization and time/phase synchronization to the remote GM, it will enter into phase lock state. In this state, the clock distribution apparatus will announce the grandmasterClockQuality information per its upstream GM (a.k.a. the grandmaster 400 for the clock distribution apparatus 100 in this example).

Namely, in embodiments of the present disclosure, the lock state indicates a synchronization with an upstream apparatus. Particularly, in embodiments of the present disclosure, the lock state comprises: a phase lock state.

State 405, Holdover: when the clock distribution apparatus loses its upstream GM, but can still have the historical data available to maintain the clock output, it will be in holdover state. This state can be further divided into holdover-in-spec and holdover-out-spec, according to standard. When the clock is in holdover-in-spec, it will announce grandmasterClockQuality.clockClass "135"; while announce grandmasterClockQuality.clockClass "165" in its announce message when the clock transit to holdover-out-spec.

Figure 5:
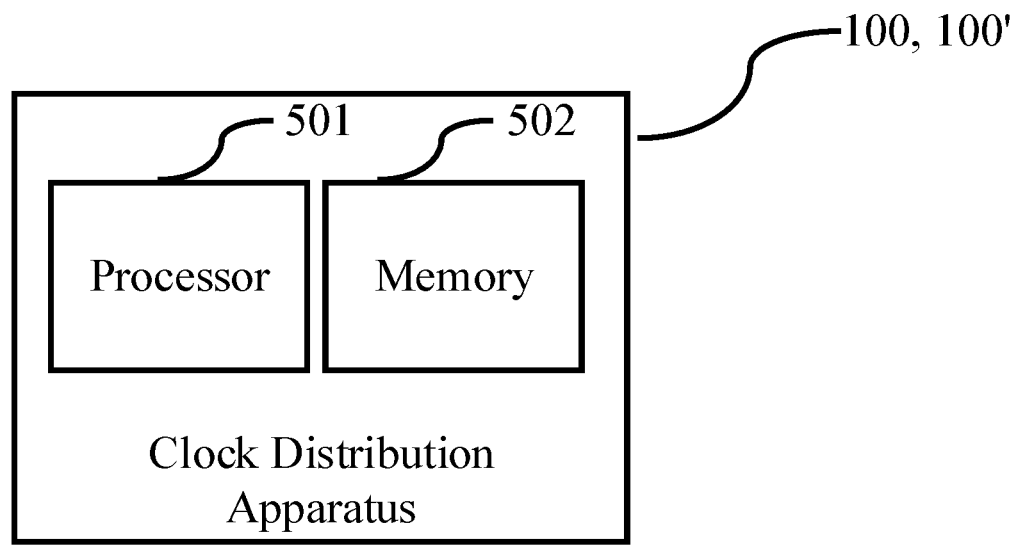
FIG. 5 is a block diagram showing a clock distribution apparatus in accordance with embodiments of the present disclosure.

FIG. 5 is a block diagram showing a clock distribution apparatus in accordance with embodiments of the present disclosure.

As shown in the FIG. 5, the clock distribution apparatus 100, 100' comprises: a processor 501; and a memory 502, containing instructions executable by the processor 501. The clock distribution apparatus 100, 100' is operative to: determine whether the clock distribution apparatus is in a lock state; and transmit, to a downstream apparatus, a second announce message when the clock distribution apparatus is in the lock state, or a first announce message when the clock distribution apparatus is not in the lock state. The first announce message is generated based on a default configuration about a local clock state of the clock distribution apparatus.

In embodiments of the present disclosure, the clock distribution apparatus 100, 100' is operative to implement the method according to any of embodiments above mentioned, such as shown in FIG. 3.

The processor 501 may be any kind of processing component, such as one or more microprocessor or microcontrollers, as well as other digital hardware, which may include digital signal processors (DSPs), special-purpose digital logic, and the like. The memory 502 may be any kind of storage component, such as read-only memory (ROM), random-access memory, cache memory, flash memory devices, optical storage devices, etc.

Figure 6A:
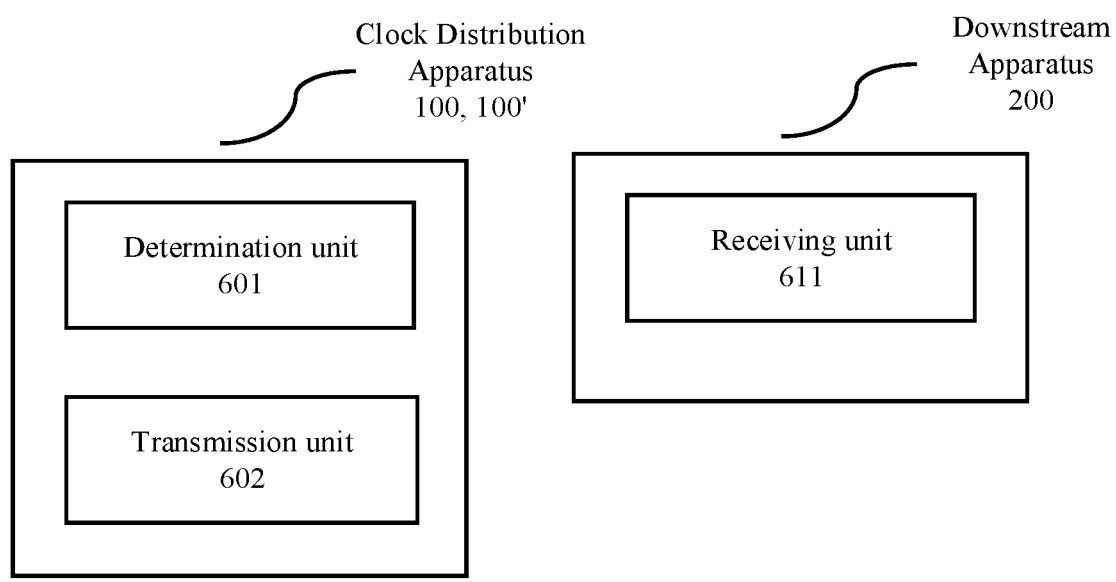
FIG. 6a is an exemplary block diagram showing function units of the clock distribution apparatus, according to embodiments of the present disclosure.
Figure 6B:
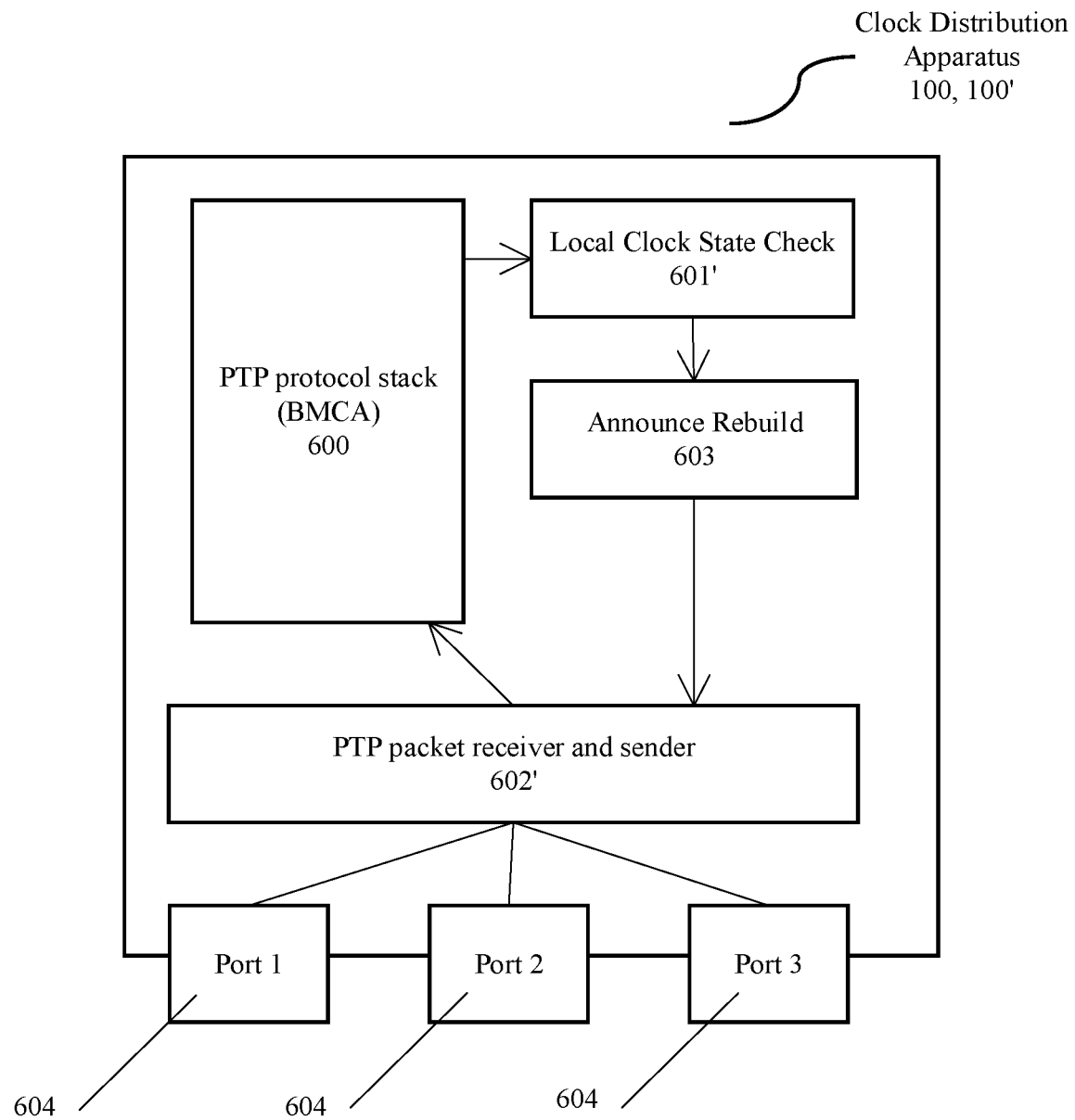
FIG. 6b is an exemplary block diagram showing an implementation of function units and other components of the clock distribution apparatus, according to embodiments of the present disclosure.

FIG. 6a is an exemplary block diagram showing function units of the clock distribution apparatus, according to embodiments of the present disclosure; FIG. 6b is an exemplary block diagram showing an implementation of function units and other components of the clock distribution apparatus, according to embodiments of the present disclosure;

As shown in FIG. 6a, the clock distribution apparatus 100, 100' may comprise: a determination unit 601, configured to determine whether the clock distribution apparatus is in a lock state; and a transmission unit 602, configured to transmit, to a second clock distribution apparatus, an announce message when the clock distribution apparatus is not in the lock state. The announce message is generated based on a default configuration about a local clock state of the clock distribution apparatus.

The downstream apparatus 200 may comprise: a receiving unit 611, configured to receive, from a first clock distribution apparatus, an announce message when the first clock distribution apparatus is not in a lock state. The announce message is generated by the first clock distribution apparatus based on a default configuration about a local clock state of the first clock distribution apparatus.

As shown in FIG. 6b, as an implementation of the units shown in FIG. 6a, the determination unit 601 may specifically comprise a local clock state check unit 601', configured to determine whether the clock distribution apparatus is in a lock state. The transmission unit 602 may specifically comprise a PTP packet receiver and sender 602', configured to transmit, to a downstream apparatus, particularly via any of ports 604, a second announce message when the clock distribution apparatus is in the lock state, or a first announce message when the clock distribution apparatus is not in the lock state.

The clock distribution apparatus 100, 100' may further comprise a announce rebuild unit 603, configured to rebuild a first announce message, based on a default configuration about a local clock state of the clock distribution apparatus.

Namely, the Local Clock state Check unit/module 601' is introduced as specific implementation. Before the Announce Messages send to the Port, the Local Clock state Check unit/module 601' checks current Local Clock state. The Announce Rebuilding unit/module 603 is specifically introduced and it is triggered when the Local Clock State is not LOCKED, and this module will replace some fields of current Announce Messages.

Local Clock state Check unit 601' is a main function and triggers another Announce Rebuilding unit 603 to work. Local Clock state Check unit 601' obtains the current Local Clock state, and check the Local Clock state is locked or not and trigger another Announce Rebuilding unit 603 to run.

Announce Rebuilding unit 603 is triggered by Local Clock Check unit 601'. If Local Clock is LOCKED state, the announce message body is not changed. If Local Clock is not LOCKED state, the Announce Rebuilding unit 603 uses the Default Data Set information to replace the Grandmaster Data Set information.

The PTP protocol stack 600 is configured to implement PTP protocol. For example, the second announce message may be generated in the PTP protocol stack 600, and might be replaced but the first announce message if necessary. The PTP protocol stack 600 may also include the BMCA as mentioned above.

These function unit/module may have conventional arrangement in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 7:
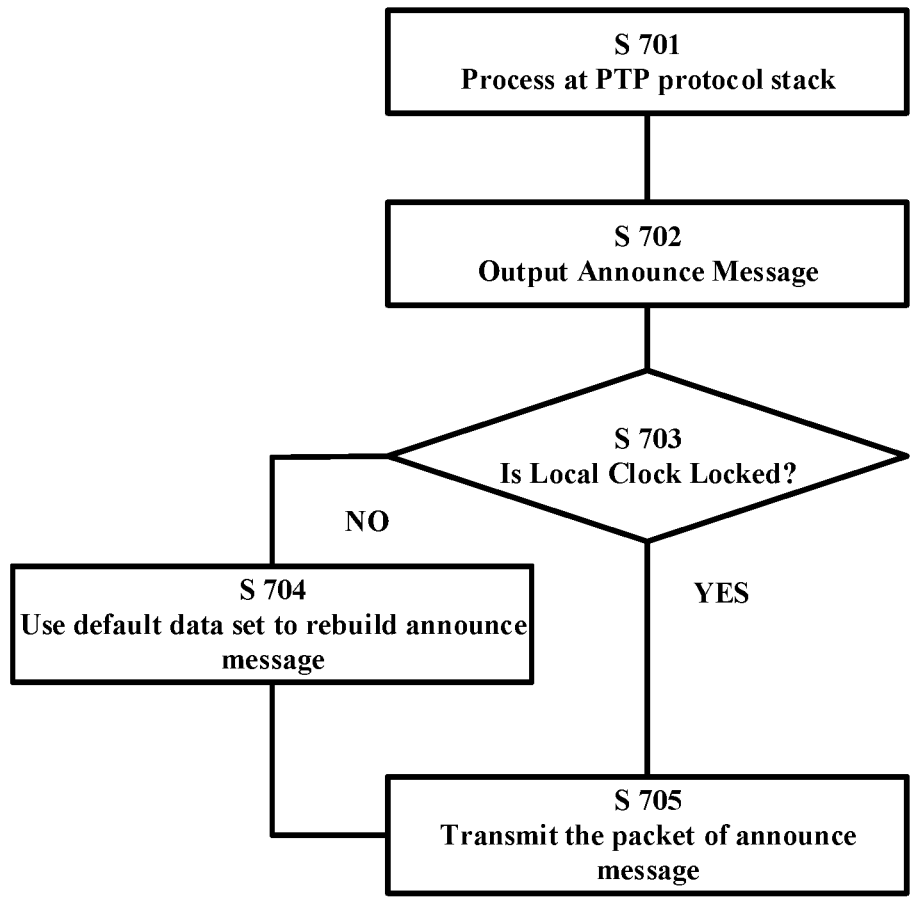
FIG. 7 is an exemplary flowing chart showing procedures relating to function units in FIG. 6, according to embodiments of the present disclosure.

FIG. 7 is an exemplary flowing chart showing procedures relating to function units in FIG. 6, according to embodiments of the present disclosure.

As shown in FIG. 7, in steps S701 and S702, the PTP protocol stack 600 processes and outputs announce message to the determination (local clock state check) unit 601. In step S703, the local clock state check unit 601 determines whether the local clock is locked or not. If yes, in step S705, the announce message is transmitted by the transmission (PTP packet receiver and sender) unit 603, directly. If no, in step S704, the announce rebuild unit 602 rebuilds the announce message using default data set, then transfers the rebuilt announce message (first announce message) to the transmission (PTP packet receiver and sender) unit 603 for transmission in the step S705.

Figure 8:
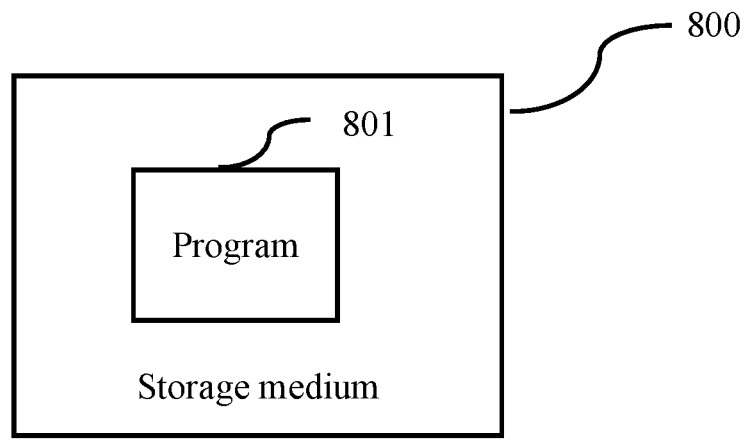
FIG. 8 is a block diagram showing a computer readable storage medium in accordance with embodiments of the present disclosure.

FIG. 8 is a block diagram showing a computer readable storage medium in accordance with embodiments of the present disclosure.

As shown in FIG. 8, a computer readable storage medium 800 has a computer program 801 stored thereon. The computer program 801 is executable by an apparatus to cause the apparatus to carry out the method according to any method above mentioned, such as shown in FIGS. 3, 7.

The computer readable storage medium 800 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

According to embodiments of the present disclosure, the clock distribution apparatus may generate announce messages based on a local clock state of the clock distribution apparatus. Thus, a downstream apparatus which receives the announce messages can make selection, based on the local clock state of the clock distribution apparatus.

Particularly, in embodiments of the present disclosure, before placing the Announce Messages on the Port, the Local Clock Locked State is checked. The Local Clock which is not in LOCKED state will not add the Grandmaster information to Announce Message fields, so as to avoid the T-BC with unstable Frequency and Phase to be chosen as the best clock for the downstream apparatuses. And after the Local Clock achieves locked state, the T-BC may be able to be chosen as best clock automatically because the Announce Messages distributed have add the Grandmaster information into the fields.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

The invention claimed is:

1. A method performed at a first clock distribution apparatus, the method comprising:
receiving from an upstream clock distribution apparatus a first announce message comprising: i) a first clock quality value indicating a clock quality of the upstream clock distribution apparatus and ii) a clock identity value for identifying the upstream clock distribution apparatus;
determining that the first clock distribution apparatus is not synchronized with the upstream clock distribution apparatus;
after determining that the first clock distribution apparatus is not synchronized with the upstream clock distribution apparatus, generating a second announce message comprising: i) a second clock quality value that indicates a lower clock quality than the clock quality of the upstream clock distribution apparatus and ii) the clock identity value for identifying the upstream clock distribution apparatus;
transmitting, to a second clock distribution apparatus, the second announce message;
after transmitting the second announce message to the second clock distribution apparatus, determining that the first clock distribution apparatus is synchronized with the upstream clock distribution apparatus;

after determining that the first clock distribution apparatus is synchronized with the upstream clock distribution apparatus, generating a third announce message comprising: i) the first clock quality value received from the upstream clock distribution apparatus and ii) the clock identity value for identifying the upstream clock distribution apparatus; and transmitting the third announce message to the second clock distribution apparatus.

2. The method of claim 1, wherein
the upstream clock distribution apparatus comprises: a grandmaster clock apparatus or a boundary clock apparatus, and determining that the first clock distribution apparatus is not synchronized with the upstream clock distribution apparatus comprises determining that the first clock distribution apparatus is not phased synchronized with the upstream clock distribution apparatus.

3. The method of claim 1, wherein
the first clock distribution apparatus is restored from a disconnection situation,
the first clock distribution apparatus is a telecom boundary clock apparatus, and
the first announce message is a precision time protocol message.

4. A method performed at a second clock distribution apparatus, the method comprising:
receiving, from a first clock distribution apparatus, a first announce message comprising: i) a clock identity value identifying an upstream clock distribution apparatus and ii) a first clock quality value associated with the clock identity value identifying the upstream clock distribution apparatus; and receiving, from the first clock distribution apparatus, a second announce message, wherein
the first clock quality value associated with the clock identity value identifying the upstream clock distribution apparatus does not indicate a clock quality of the upstream clock distribution apparatus,
the second announce message comprises: i) the clock identity value identifying the upstream clock distribution apparatus and ii) a second clock quality value associated with the clock identity value identifying the upstream clock distribution apparatus,
the second clock quality value associated with the clock identity value identifying the upstream clock distribution apparatus indicates a clock quality of the upstream clock distribution apparatus,
the first clock quality value was selected or generated by the first clock distribution apparatus,
the second clock quality value is greater than the first clock quality value, and
the first clock distribution apparatus received the second clock quality value from the upstream clock distribution apparatus prior to transmitting the first announce message.

5. The method of claim 4, wherein
the upstream clock distribution apparatus comprises: a grandmaster clock apparatus or a boundary clock apparatus.

6. The method of claim 4, wherein
the first clock distribution apparatus is restored from a disconnection situation,
the first clock distribution apparatus is a telecom boundary clock apparatus, the first announce message is a precision time protocol message.

7. A first clock distribution apparatus, comprising:
a processor; and
a memory containing instructions executable by the processor, wherein the first clock distribution apparatus is configured to perform a method comprising:
receiving from an upstream clock distribution apparatus a first announce message comprising: i) a first clock quality value indicating a clock quality of the upstream clock distribution apparatus and ii) a clock identity value for identifying the upstream clock distribution apparatus;

determining that the first clock distribution apparatus is not synchronized with the upstream clock distribution apparatus;

after determining that the first clock distribution apparatus is not synchronized with the upstream clock distribution apparatus, generating a second announce message comprising: i) a second clock quality value that indicates a lower clock quality than the clock quality of the upstream clock distribution apparatus and ii) the clock identity value for identifying the upstream clock distribution apparatus;

transmitting, to a second clock distribution apparatus, the second announce message;

after transmitting the second announce message to the second clock distribution apparatus, determining that the first clock distribution apparatus is synchronized with the upstream clock distribution apparatus;

after determining that the first clock distribution apparatus is synchronized with the upstream clock distribution apparatus, generating a third announce message comprising: i) the first clock quality value received from the upstream clock distribution apparatus and ii) the clock identity value for identifying the upstream clock distribution apparatus; and transmitting the third announce message to the second clock distribution apparatus.

8. The first clock distribution apparatus of claim 7, wherein
the first clock distribution apparatus is restored from a disconnection situation,
the first clock distribution apparatus is a telecom boundary clock apparatus, and
the first announce message is a precision time protocol message.

9. A second clock distribution apparatus, comprising:
a processor; and
a memory, containing instructions executable by the processor;
wherein the second clock distribution apparatus is operative to:
receive, from a first clock distribution apparatus, a first announce message comprising: i) a clock identity value identifying an upstream clock distribution apparatus and ii) a first clock quality value associated with the clock identity value identifying the upstream clock distribution apparatus; and receive, from the first clock distribution apparatus, a second announce message, wherein
the first clock quality value associated with the clock identity value identifying the upstream clock distribution apparatus does not indicate a clock quality of the upstream clock distribution apparatus, the second announce message comprises: i) the clock identity value identifying the upstream clock distribution apparatus and ii) a second clock quality value associated with the clock identity value identifying the upstream clock distribution apparatus, the second clock quality value associated with the clock identity value identifying the upstream clock distribution apparatus indicates a clock quality of the upstream clock distribution apparatus, the first clock quality value was selected or generated by the first clock distribution apparatus, the second clock quality value is greater than the first clock quality value, and the first clock distribution apparatus received the second clock quality value from the upstream clock distribution apparatus prior to transmitting the first announce message.

10. The second clock distribution apparatus of claim 9, wherein
- a lock state indicates a synchronization of the first clock distribution apparatus with the upstream clock distribution apparatus,
- the upstream clock distribution apparatus comprises: a grandmaster clock apparatus or a boundary clock apparatus, and
- the lock state comprises a phase lock state.

11. The first clock distribution apparatus of claim 7, wherein
- the upstream clock distribution apparatus comprises: a grandmaster clock apparatus or a boundary clock apparatus, and
- determining that the first clock distribution apparatus is not synchronized with the upstream clock distribution apparatus comprises determining that the first clock distribution apparatus is not phased synchronized with the upstream clock distribution apparatus.

* * * * *